(No Model.)
L. VON FROBEN.
NUT LOCK.
No. 390,631. Patented Oct. 2, 1888.
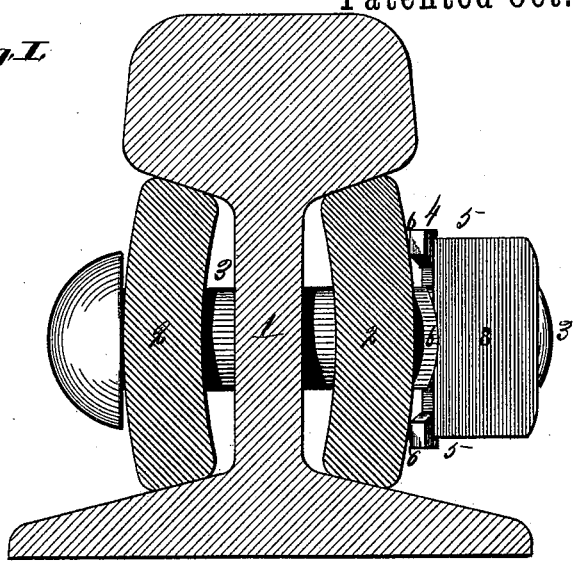
Fig. I.
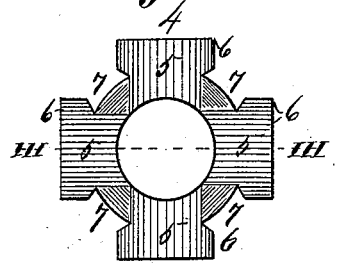
Fig. II.
Fig. III.
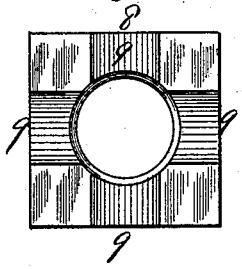
Fig. IV.
Attest:
Geo. N. Hinchman Jr.
E. Arthur
Inventor:
Louis von Froben.
By Knight Bros.
attys.

UNITED STATES PATENT OFFICE.

LOUIS VON FROBEN, OF ST. LOUIS, MISSOURI.

NUT-LOCK.

SPECIFICATION forming part of Letters Patent No. 390,631, dated October 2, 1888.

Application filed May 14, 1888. Serial No. 273,803. (No model.)

*To all whom it may concern:*

Be it known that I, LOUIS VON FROBEN, of the city of St. Louis, in the State of Missouri, have invented a certain new and useful Improvement in Nut-Locks, of which the following is a full, clear, and exact description, reference being had to the accompanying drawings, forming part of this specification.

This invention relates to a device for a spring-washer nut-lock; and the invention consists in features of novelty hereinafter fully described, and pointed out in the claims.

Figure I is a vertical section and shows the spring-washer sprung by the nut and the convex arches of its radial or divergent wings seated in the recesses in the inner face of the nut. Fig. II is a front view of the spring-washer and shows its divergent forwardly-projecting spring-wings. Fig. III is a section taken on line III III, Fig. II, and shows the forward projection and friction-jaws of said wings; and Fig. IV is an inner face view of the nut and shows the recesses therein that engage with the convexity of the spring-wings of the washer, and thus, in conjunction with the washer, locks itself when home.

Referring to the drawings, in which similar figures of reference indicate like parts in all the views, 1 represents the track-rail, 2 the fish-plates, and 3 the bolt of a rail-splice to which my invention is attached.

4 represents my spring-washer, 5 its divergent concavo-convex spring-arms, 6 the friction bite or jaws at the ends of said arms that contact with the fish-plates, and 7 the gusset or angle bracket that is contracted on a level plane itself, but connects or couples the adjoining projecting spring-wings of said washer.

8 represents the screw-nut, which is constructed or adapted for use with the spring-washer, with recesses 9 in the inside face of said nut, which recesses engage with the convex sides of the divergent wings of the spring-washer, and as the nut is turned and springs down the washer the said convexities of said wings spring into said recesses in the forward face of the nut and lock it in its operative position.

The grip of the jaws 6 at the same time firmly bites the face of the fish-plate, and thus prevents the turning of the washer on the plate. It will also be seen that the convex grip-jaw provides a double bite on the fish-plate to each wing of the washer, that greatly re-enforces its hold on the fish-plate by the spring tension of said arms under the pressure of the advancing nut.

It will also be seen that I provide a compound spring-washer which has a longitudinal spring lengthwise of the wings, that is the first to be materially affected by the pressure of the advancing nut, and also a transverse spring across the arch of the grip jaw, that, as the nut still advances, especially as its corners come in line with the center of said arches, causes the arches of the grip to spread or sprawl, and thus spring outward on the fish-plate, exercising the twofold functions of a double spring.

When it is understood that, especially when a train is turning round a curve, and at other times when it surges from side to side, there is a great lateral strain on the screw-thread of the bolts and nuts that secure the splice, so that the strain is frequently known to strip the thread from the same, another of the advantages of my double-spring locking-nut is seen, for it double cushions both its lock and the tension-bearings of the screw-nut. Thus it will be seen that it provides a double-spring nut-lock, which, the one spring action being longitudinal and the other transverse, is sprung from diverse angles, so as to relatively present a recuperating spring action approximating in its line of defense that of the advance of the shock. Consequently the compound springs cushion nearly directly against the advance line of the varied shocks, let them come from what quarter they will.

Another advantage of the transverse spring that forms the arch of the grip-jaw is that as the nut is turned and its diagonal corners press on the apex of said arch the bite sprawls on the fish-plate and the spring-arch bows under the pressure to allow the nut free passage, and then springs back to its locking-grip of said nut.

I claim as my invention—

1. In a nut-lock, the concavo-convex steel washer with divergent concavo-convex spring-wings, substantially as and for the purpose set forth.

2. In a nut-lock, a steel washer with divergent wings having dual locking-springs, consisting of longitudinal concavo convex springs and transverse concavo-convex springs, substantially as and for the purpose set forth.

3. In a nut-lock, the concavo-convex steel washer with divergent concavo-convex spring-wings and the convex grip-jaws that enforce a friction hold of the fish-plate, substantially as and for the purpose set forth.

4. In a nut-lock, the combination of the concavo-convex steel washer with divergent projecting concavo-convex spring-wings, the gusset angle-junctions on a level plane that connect said wings, and the convex grip-jaws that enforce a friction hold of the fish-plate, substantially as and for the purpose set forth.

5. In a nut-lock, the combination of the concavo-convex steel washer with divergent concavo-convex spring-wings, the convex grip-jaw that enforces a friction hold of the fish-plate, and the screw-nut provided with recesses in its inner face that engage with the corresponding convex surfaces of the divergent wings, all arranged to lock the washer to the fish-plate and the nut to the washer, substantially as and for the purpose set forth.

LOUIS VON FROBEN.

In presence of—
 BENJN. A. KNIGHT,
 JOS. WAHLE.